(12) United States Patent
Seibert et al.

(10) Patent No.: US 8,958,400 B2
(45) Date of Patent: Feb. 17, 2015

(54) WIRELESS DEVICE WITH OPPORTUNISTIC BAND ACCESS

(75) Inventors: Cristina Seibert, Mountain View, CA (US); Elad Gottlib, San Ramon, CA (US)

(73) Assignee: Silver Spring Networks, Inc., Redwood City, CA (US)

(*) Notice: Subject to any disclaimer, the term of this patent is extended or adjusted under 35 U.S.C. 154(b) by 1323 days.

(21) Appl. No.: 12/580,741

(22) Filed: Oct. 16, 2009

(65) Prior Publication Data

US 2011/0090878 A1    Apr. 21, 2011

(51) Int. Cl.
*H04W 4/00*     (2009.01)
*H04W 28/18*    (2009.01)
*H04W 4/08*     (2009.01)
*H04W 24/00*    (2009.01)

(52) U.S. Cl.
CPC .............. *H04W 28/18* (2013.01); *H04B 1/406* (2013.01); *H04W 4/08* (2013.01); *H04W 24/00* (2013.01)
USPC ........................................ 370/338

(58) Field of Classification Search
USPC ........................................ 370/338
See application file for complete search history.

(56) References Cited

U.S. PATENT DOCUMENTS

| | | | |
|---|---|---|---|
| 8,095,162 B2* | 1/2012 | Karaoguz et al. | 455/509 |
| 8,249,527 B2* | 8/2012 | Rybicki | 455/101 |
| 2004/0196812 A1* | 10/2004 | Barber | 370/334 |
| 2005/0164687 A1* | 7/2005 | DiFazio | 455/418 |
| 2006/0111042 A1* | 5/2006 | Pitchers | 455/20 |
| 2007/0019672 A1* | 1/2007 | Guthrie | 370/466 |
| 2007/0161358 A1* | 7/2007 | Bogdan | 455/168.1 |
| 2007/0263709 A1* | 11/2007 | Kasslin et al. | 375/222 |
| 2008/0130519 A1 | 6/2008 | Bahl et al. | |
| 2008/0192721 A1* | 8/2008 | Pernu et al. | 370/345 |
| 2008/0232391 A1* | 9/2008 | Spinar et al. | 370/449 |

(Continued)

FOREIGN PATENT DOCUMENTS

WO    WO 2008/144323 A1    11/2008
WO    2009/068799 A1    6/2009

OTHER PUBLICATIONS

International Search Report (PCT/ISA/210) and the Written Opinion of the International Searching Authority (PCT/ISA/237) issued in corresponding International application No. PCT/US2010/002674 dated Apr. 4, 2011.

(Continued)

*Primary Examiner* — Derrick Ferris
*Assistant Examiner* — Faisal Choudhury
(74) *Attorney, Agent, or Firm* — Buchanan Ingersoll & Rooney PC

(57) ABSTRACT

A wireless communication network system includes a plurality of nodes. Each node from the plurality of nodes includes a plurality of communication modules. Each module includes a modem and is configured to operate according to a communication protocol. Each communication module is configured to monitor its own communication parameter data and to cooperate with companion modules of a node by sharing communication parameter data, for instance through a coordination unit. Each communication module is further configured to allow, preferably according to a predefined set of rules, communication using a protocol of one communication module by utilizing a band associated with a companion module. The sharing of communication parameter data between modules may be continuous sharing or periodic sharing.

23 Claims, 8 Drawing Sheets

(56) References Cited

U.S. PATENT DOCUMENTS

| | | | |
|---|---|---|---|
| 2008/0311938 A1* | 12/2008 | Song | 455/500 |
| 2009/0073876 A1* | 3/2009 | Kimmich et al. | 370/229 |
| 2009/0116437 A1* | 5/2009 | Alexandre et al. | 370/329 |
| 2009/0180451 A1* | 7/2009 | Alpert et al. | 370/338 |
| 2009/0213749 A1* | 8/2009 | Han | 370/252 |
| 2009/0231960 A1* | 9/2009 | Hutcheson | 368/10 |
| 2009/0268674 A1* | 10/2009 | Liu et al. | 370/329 |
| 2010/0029216 A1* | 2/2010 | Jovicic et al. | 455/68 |
| 2010/0062785 A1* | 3/2010 | Hwang | 455/452.1 |
| 2010/0105408 A1* | 4/2010 | Palmer et al. | 455/454 |
| 2010/0136907 A1* | 6/2010 | Zhou et al. | 455/41.2 |
| 2010/0189084 A1* | 7/2010 | Chen et al. | 370/338 |
| 2010/0255853 A1 | 10/2010 | Kountouris | |
| 2012/0002627 A1* | 1/2012 | Norlen et al. | 370/329 |
| 2012/0295670 A1* | 11/2012 | Rofougaran | 455/572 |
| 2013/0301622 A1* | 11/2013 | Bahl et al. | 370/336 |

OTHER PUBLICATIONS

International Search Report issued in corresponding International application No. PCT/US2010/002674 dated Jan. 18, 2011.

Patricia Martigne et al., "An Alternative Concept to Scanning Process for Cognitive Radio Systems: Technical and Regulatory Issues", 16th IST Mobile and Wireless Communications Summit, 2007 IEEE, Jul. 1, 2007, pp. 1018-1022, Piscataway, NJ, USA, XP002483696.

Taiwanese Office Action issued Aug. 2, 2013 by the Taiwanese Patent Office for corresponding patent application No. 099134995.

* cited by examiner

WIRELESS DEVICE WITH OPPORTUNISTIC BAND ACCESS

BACKGROUND OF THE INVENTION

1. Field

The present invention is directed to devices in wireless communication network systems, and more specifically to devices that support a plurality of communication protocols and communication in a plurality of bands.

2. Related Background

Due to increasing popularity in wireless technology and mobile communications, bands have become crowded, specifically in the unlicensed spectrum. However, at times and within geographic locations, large portions of the bands in the licensed spectrum remain underutilized and even unused. With the advent of cognitive radios, discussions have been raised regarding scavenging and utilizing the open spectrum bands, known as "white spaces" (i.e., portions of the licensed bands that are not in active use), on which communication devices can communicate. Conventional systems (e.g., cognitive radio) can scan the communication spectrum to determine spectrum utilization. However, such scanning can be costly and inefficient and can only be used to affect decisions on turning receivers associated with particular bands on or off.

On a different note, integrated radio devices are available on the market, such as offered by Silver Spring Networks that integrates an 800 MHz 3G modem, a 2.4 GHz ZigBee modem, and a 900 MHz SSN modem.

Thus, a need exists for an improved system that seeks to overcome limitations of conventional wireless communication network systems.

SUMMARY OF THE INVENTION

The present invention enables, depending on the embodiments, leveraging data already generated regarding the state of individual radios (also referred to herein as modules) pertaining to coverage in their respective bands for particular geographic regions, the state of the radio operations and operating state of the transmitter, and so on (e.g., out-of-service (OOS), idle, in-traffic, etc.). This information may be coordinated and shared among the radio modules for the purpose of inter-radio-band access, preferably following defined rules, such as permitting the modem to transmit or receive communications on a band different from its normal band when it is OOS or idle, or when its band is unoccupied, or when the time-of-day is late night and/or the day-of-week is on a weekend. Other rules may include the age of the state information, individual radio requirement and patterns of usage, those artificially imposed by system controllers to prevent traffic blockages, interference or overload by balancing traffic on a given band or bands and the like.

Systems and related methods for communication in a wireless communications network are described herein. In some embodiments, systems for a wireless communication network include at least one, or alternatively, a plurality of nodes. Each node includes a plurality of communication modules (radios). Each communication module includes a modem and is configured to operate according to a communication protocol. Each communication module is configured to monitor its own communication parameter data (operating state, Signal to Noise Ratio (SNR), interferences, attenuation and/or other measures of module performance) and to cooperate with one or more modules of a node by sharing communication parameter data with each other. Each communication module is further configured to allow communication of one communication module by utilizing a band associated with a companion module. Companion modules are modules that share their parameter data with the other module(s) with which they are a companion.

A distributed approach or an intelligent coordinator may be used to implement the various criteria and rules. In the distributed approach, intelligence would reside at each individual radio module and information would be communicated among the companion modules. In the intelligent coordinator approach, intelligence would reside in one unit, a coordination unit (for example, in firmware at some DSP processor with shared access to various radio modules or in software at some general purpose processor), which would inspect, coordinate and control the individual radio modules.

BRIEF DESCRIPTION OF THE DRAWINGS

These and other features, objects and advantages of various embodiments of the present invention will become more apparent from the following detailed description when read in conjunction with the accompanying drawings. It should be noted that not all possible embodiments of the invention will have all, most or any of the exemplary features, objects or advantages. The non-limiting examples disclosed herein are merely illustrative. In the drawings, like reference numbers indicate identical or functionally similar elements.

DETAILED DESCRIPTION OF EXEMPLARY EMBODIMENTS

Overview

Figure 1:
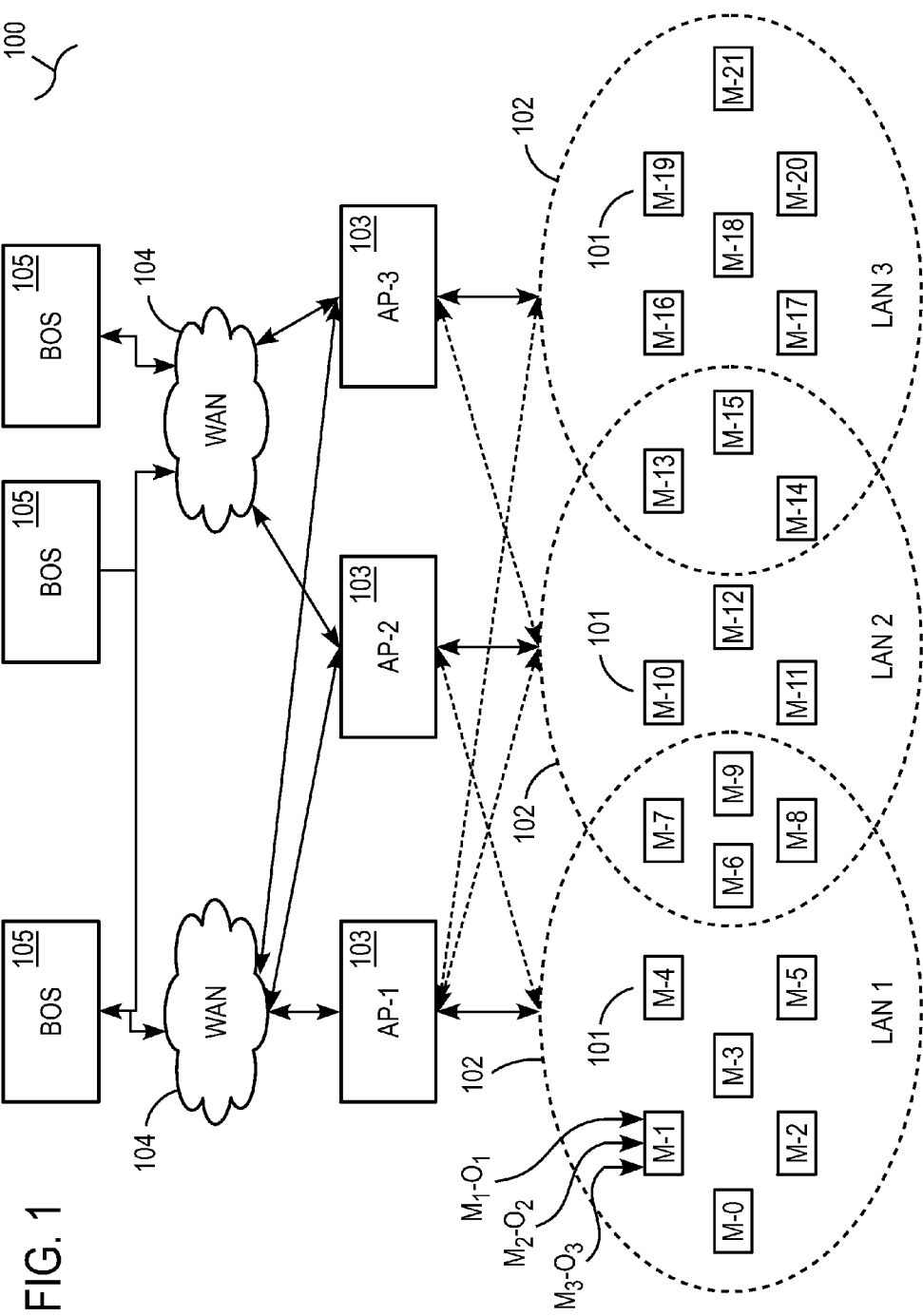
FIG. 1 is a generalized block diagram illustrating a computer-based system, according to an exemplary embodiment of the invention.

In some exemplary embodiments, a system for a wireless communication network includes at least one, and typically a plurality of, nodes having a plurality of communication modules. Each communication module includes a modem and is configured to operate according to a communication protocol. Each communication module is configured to monitor its own communication parameter data and to cooperate with companion modules of a node by sharing communication parameter data either directly between companion modules in a distributed intelligence approach, or through a coordination unit in an intelligent coordinator approach. Each communication module is further configured to allow communication (either one way i.e., up or down link, or in both directions) of one communication module by utilizing a band associated with a companion module.

Hence, exemplary embodiments can include a wireless system design that supports a plurality of communication protocols and reception/transmission in a plurality of bands. This idea can be used to scavenge bandwidth that is underutilized in license-free and possibly even licensed bands if permitted by controlling regulations. The present invention can, in particular exemplary embodiments, utilize cooperation between modules either by directly coordinating, or coordinating through a coordination unit, to implement communication protocols in the various bands as to achieve optimal spectrum access and usage. Here, it should be noted that the coordination unit can be retrofit into preexisting communication nodes.

One can think of communication protocols as having one or a set of primary bands on which they operate. For example, cellular communication takes place at ~800 MHz, PCS communication at ~1.9 GHz, ZigBee at 2.4 GHz, the Silver Spring Network smart utility network runs at ~900 MHz, cognitive radios may operate in the 550 MHz or 790 MHz bands also known as "white spaces", although these can change and the present invention is not limited to these frequency bands or these particular protocols. For instance, in other embodiments, the WPAN may be any one, or any combination, of network technologies or standards including, without limitation, Bluetooth, ZigBee (IEEE 802.15.4), IrDA, UWB (IEEE 802.15.3), Dust TSMP, Insteon, other technologies based upon IEEE 802.15, etc., or other communication protocols. One can define secondary bands to be all other bands that are not primary bands to a given communication protocol.

Particular embodiments of the present invention can be based in part on a concept that a modem accesses its secondary band(s) under a set of rules, such as:

Primary band is unavailable, unreliable, overloaded, etc.; and

Modem for which band is a primary band ("companion modem") is in a specific state, including Out-of-Service or Idle and band unoccupied, late at night or during the weekend.

A distributed approach or an intelligent coordinator unit may be used to implement criteria/rules, based on information such as age of the status bit, individual radio requirements, and patterns of usage, etc.

In some embodiments, a node of a wireless network system includes a plurality of communication modules. Each communication module includes a modem (e.g., wireless transceiver(s), power line adapter, Ethernet connection) and is configured to operate according to a communication protocol. Each communication module is configured to monitor its communication parameters and share its communication parameter information with companion modules such that each communication module, according to a set of rules, can cooperate with the companion modules to allow communication of one module by utilizing a band associated with a companion module.

A module that needs to transmit but runs into access problems in its primary band could cooperate with modules operating in its corresponding secondary bands as to:

1. Use other bands if no transmissions are occurring or planned at that time and the channel is estimated as empty.

2. Piggy-back on the transmission on that particular channel if a transmission is going on or planned at that time.

3. Queue message for future transmission in that band if consistent failures occur in other band(s).

A channel may be estimated as unoccupied if the power level of the received samples is below some threshold. More sophisticated spectral analysis techniques may be used to analyze the band and decide if an actual transmission is occurring at that time. For example, the bandwidth used has to fit the properties of the channel usage per that particular communication protocol. Time based analysis may be used as well, for example, to see if the signal has the expected autocorrelation properties.

In some embodiments, a method of communication in a network system includes monitoring communication parameter data at each communication module from a plurality of modules of a node, each module being configured to operate according to a communication protocol. Each module shares its communication parameter data with companion modules and communication is allowed of one communication module in a band associated with a companion module.

More specifically, receivers in the modules can have one or both functionalities of:

1. Having circuits that implement a given communication protocol scan all possible bands where transmissions intended for such receivers might occur. While such scanning could add overhead, technologies at the time of the authoring of this disclosure allow for efficient, fast scans that can reliably detect if a communication is taking place in that band, and it is understood that such technologies will likely get better. Also, such scanning could be done rarely if needed to save on aspects such as power consumption, however evidently at the cost of added latency; and 2. Having circuitry operating in various bands inform other modules that a reception may have occurred in which they may be interested. This approach would remove the need for particular communication modules from scanning a large set of bands. Since the module associated with the band where the message is received may not have capability to demodulate that particular message (as it may implement a different communication protocol), it can simply pass the signal samples (e.g., I and Q voltages at base-band) to the intended module for actual demodulation.

Furthermore, communication between such modules can be used to optimize the timing of transmissions. One reason for this is minimizing cross-interference, particularly when there is overlap between the bands used by the various communication modules.

Finally, a multi-band communication scheme is proposed where device A can send to device B on one band and device B replies back to device A on another. For example: if the A to B communication is a short message and B to A communication is a long reply (e.g., data) and it might be appropriate to keep one band dedicated to short messages (for example, if it is a channel challenged band), or if the A to B communication has a better link on one band due to multiple paths and the B to A communication has a better link on another band due to the same or different reason. The reason can be an arbitrary choice too.

An example where these ideas may be used are products that incorporate a variety of modem components including a 3G (WCDMA) communication modem that operates in licenses spectrum, proprietary frequency-hopping-based communication modem that operates various unlicensed bands, an 802.15.4 modem that implements the ZigBee protocol and operates in unlicensed 2.4 GHz spectrum, as exemplars, but other wireless modems from the past, present or future can be used. This idea enables access to licensed spectrum by protocols currently using license-free spectrum if regulation rules make it possible. It also enables optimal sharing of the 2.4 GHz band between the proprietary FHSS-based module and ZigBee module, as further examples.

Exemplary Systems

FIG. 1 is a generalized block diagram of a network, and in particular a utility network 100 that may be used to implement embodiments of the present invention. Such utility networks are described in greater detail in U.S. Patent Application Publication No. 2008/0189436, for instance, herein incorporated by reference for all purposes. The utility network 100 may include one or more electronic devices 101. In a preferred embodiment, the electronic devices 101 may be connected over a wireless Local Area Network (LAN) 102. In the example of a utility network, the LAN may be a neighborhood area network (NAN) corresponding to a neighborhood or service area for the utility. As shown in the example embodiment, multiple LANs (LAN 1, LAN 2, LAN 3) may be used, which may or may not overlap, such that a given electronic device can be connected to (or be part of) only one wireless LAN or multiple wireless LANs. Further, various LANs would be contiguous at least in part, wherein each may be associated with a different medium/protocol. The electronic devices 101 may be any type of electronic device. In the illustrated embodiments, the electronic devices are nodes M-0 through M-21 (e.g., utility nodes).

Utility nodes can include a utility meter or can connect to a utility meter. A utility meter is a device which is capable of measuring a metered quantity, typically a commodity like electricity, water, natural gas, etc. Utility nodes which connect to a utility meter may include a network interface card (NIC) for communicating on a network (e.g., a "smart grid"), and may include two or more RF transceivers for communicating on two or more wireless LANs. The NIC is configured to employ any suitable connection agent for connecting to the network including, for example, a modem, a wireless transceiver, a power line adapter, or an Ethernet connection, all generically referred to as modems herein.

Although the nodes 101 are described and illustrated in FIG. 1 as utility meter nodes, other known electronic devices can be used. For example, in some embodiments, the nodes 101 can be communication devices, such as set top boxes (as may be used in cable television or satellite television delivery). In other embodiments, the nodes 101 can be household appliances (e.g., refrigerator, heater, light(s), cooking appliances, etc.). In yet other embodiments, the nodes 101 can be computers or computing devices (e.g., game consoles, storage devices, PCs, servers, etc.). Other examples of nodes 101 include, but are not limited to, networking devices such as relay, gateway, access point, router, or other networking devices, phones or cell phones, battery storage devices, transportation devices, transportation vehicles (for example, an electric or hybrid car or other vehicle), entertainment devices (e.g., TVs, DVD players, set top boxes, gaming consoles, etc.), or other device which may be found in a home, business, roadway or parking lot, or other location.

The utility network 100 may include relays configured to handle communication between nodes M-1 through M-21 and the wireless LAN 102. For example, a relay could provide communication between the node 101 and the infrastructure of the wireless network. Unless otherwise noted, other devices in the network 100 such as meters, electronic devices, gateways, etc., may also perform as relays, and relays may perform the functions of other devices or software on the network.

The wireless LAN 102 may be any type of wireless network, and may use any frequency, communications channel or communications protocol.

The LANs 102 are typically connected to one or more access points (AP) 103. As shown in FIG. 1, LANs 102 are connected to three access points (AP-1, AP-2, AP-3). However, those of skill in the art should understand that any number of access points 103 can be used. For example, in some embodiments, a given LAN 102 can be connected to a single AP 103. In other embodiments, a given LAN 102 can be connected to two access points 103. In yet other embodiments, a given LAN 102 can be connected to four or more access points, and a given access point 103 connected to two or more LANS 102.

The access points 103 may be connected to one or more wide area networks (WAN) 104. The WANs 104 may be connected to one or more back office systems (BOS) 105. The back office system 105 may handle a variety of business or management tasks, including participation in the collection of metering information, managing metering devices, security for the network, or other functions as may be desired in an Advanced Metering Infrastructure (AMI) network. Examples of back office systems include billing and accounting systems, proxy servers, outage detection systems (as may be used in a utility network), data storage systems, etc.

Nodes 101 within the communications network, which may be a LAN or a WAN, or a combination of both, may communicate using one or more protocols. Nodes 101 may include an electronic device, a relay, an access point, a router, or a BOS. In the illustrated embodiment, each node 101 from the plurality of nodes M-0 through M-21 includes a plurality of communication modules. The communication modules include a radio transceiver for sending and receiving communications on one or a set of primary bands on which they operate. For example, cellular communication is configured to operate in the 800 MHz radio band, personal communication service (PCS) is configured to operate in the 1.9 GHz radio band, ZigBee communication is configured to operate in the 2.4 GHz radio band, and cognitive radios are configured to operate in the 550 MHz or 790 MHz bands also known as "white spaces."

The communication modules $M_1$, $M_2$, $M_3$ are configured to communicate using one or more communication protocols. To illustrate the plurality of modules included within the plurality of nodes, node M-0 is provided and described by way of example. For illustration purposes, node M-0 includes three communication modules $M_1$, $M_2$, $M_3$. Each is configured to operate according to a given communication protocol $M_1$-$O_1$, $M_2$-$O_2$, $M_3$-$O_3$. The communication protocols can be any suitable known protocol including, for example, ZigBee protocol, 3G protocol, SSN protocol, PCS protocol, and FHSS protocol. In some embodiments, the communication modules can communicate using the same communication protocol. In other embodiments, the communication modules can communicate using different communication protocols. For example, in some embodiments, communication module $M_1$ can operate according to the ZigBee protocol, while communication module $M_2$ operates according to the 3G protocol, and communication module $M_3$ operates according to the SSN protocol. Each module, however, operates on a different frequency band (although they can be overlapping in certain instances).

Although three communication modules ($M_1$ through $M_3$) are shown per node 101 and described in the illustrated embodiment, those of skill in the art should understand that any number of communication modules in each node, and of course not every node needs the same number of modules, can be used. In some embodiments, the nodes 101 can include two, three or more communication modules. In other embodiments, the nodes 101 can include two communication modules $M_1$, $M_2$, $M_3$. When the modules $M_1$, $M_2$, $M_3$ cooperate they are companion modules.

The communication between the plurality of modules within a node is described in more detail below.

Figure 2:
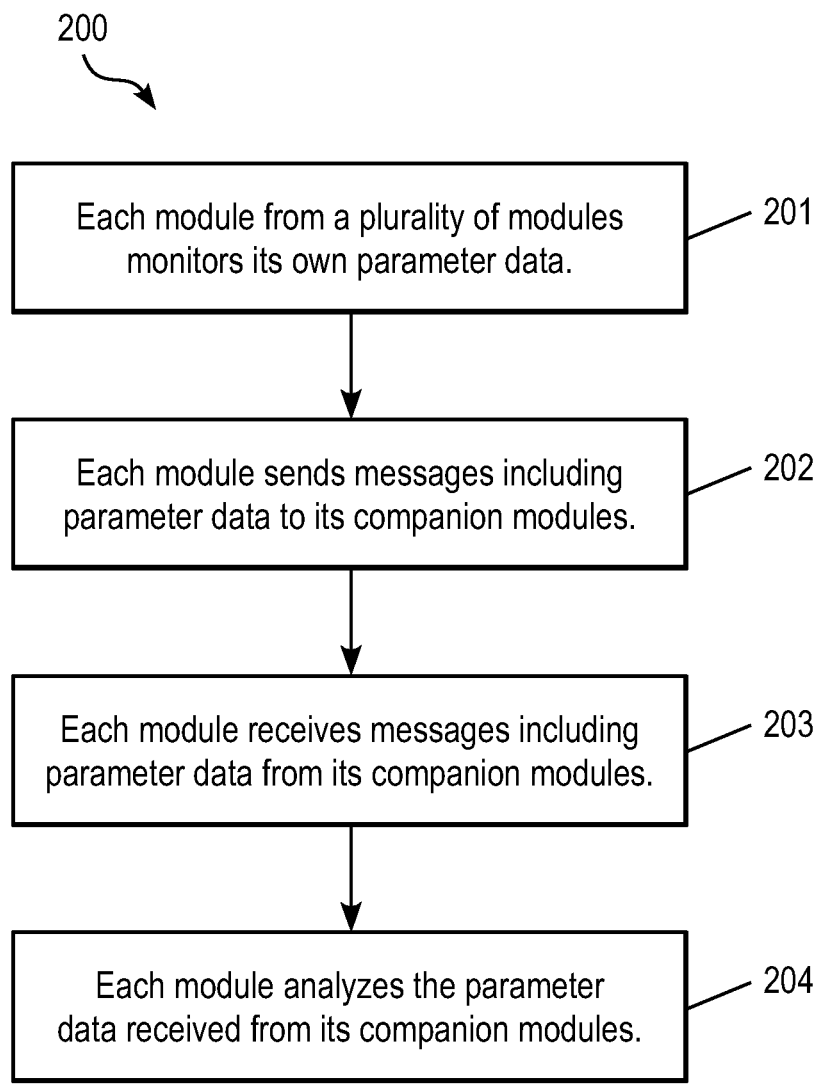
FIG. 2 is a generalized flow diagram illustrating a process for sharing parameter data information between a communication module and its companion modules according to an exemplary embodiment of the invention.

FIG. 2 is a generalized flow diagram illustrating a process 200 for sharing parameter data information between a communication module M1 and its companion M2, M3 modules. At step 201, each communication module M1; M2, M3 from the plurality of modules monitors its own communication parameter data. Communication parameter data can include frequency, bandwidth, band availability, band reliability, modem state, band occupancy, radio requirements, etc., either all together, subsets thereof, or individual details thereof, and the invention is not limited to any particular set of parameters. The parameters can be those that one might expect to be optimized for a given system, location or operating condition. At step 202, each communication module M1, M2, M3 from the plurality of modules communicates with its companion modules by distributing messages including its own communication parameter data. In addition to its own communication parameter data, message content can include transmission status of companion modules, status checks of it own messages, location of alternative paths for transmission, long and short messages, etc. At step 203, each communication module M1; M2, M3 from the plurality of modules receives messages including communication parameter data from its companion modules. Steps 202 and 203 can be performed substantially simultaneously or separately in either sequence (203 then 204, or 204 then 203). Said another way, communication modules M1; M2, M3 can concurrently or sequentially send their own parameter data information and receive its companion modules' parameter data information. In the presently preferred embodiment, each communication module M1; M2, M3 is configured to cooperate with its companion modules of a node 101 by sharing communication parameter data in a continuous bidirectional manner. However, in other embodiments, each communication module M1; M2, M3 can be configured to cooperate with its companion modules by periodically sharing communication parameter data in a unidirectional mode.

At step 204, each communication module $M_1$, $M_2$, $M_3$ analyzes the parameter data information received from its companion modules. By analyzing its companion modules' parameter data, a communication module can determine if there are underutilized or unused bands associated with its companion modules.

Not only can communications (e.g., sharing of communication parameter data) between modules help modules determine the underutilization of bands, but can also be used to optimize the timing of transmissions. This can accomplish minimizing cross-interference, particularly when there is an overlap between the bands used by the plurality of communication modules. Also, the modules of a node can use band access when explained above, information on band availability from companion modules and information on modem usage (e.g., DSPs and transceivers to derive a schedule for band access by each modem).

Figure 3:
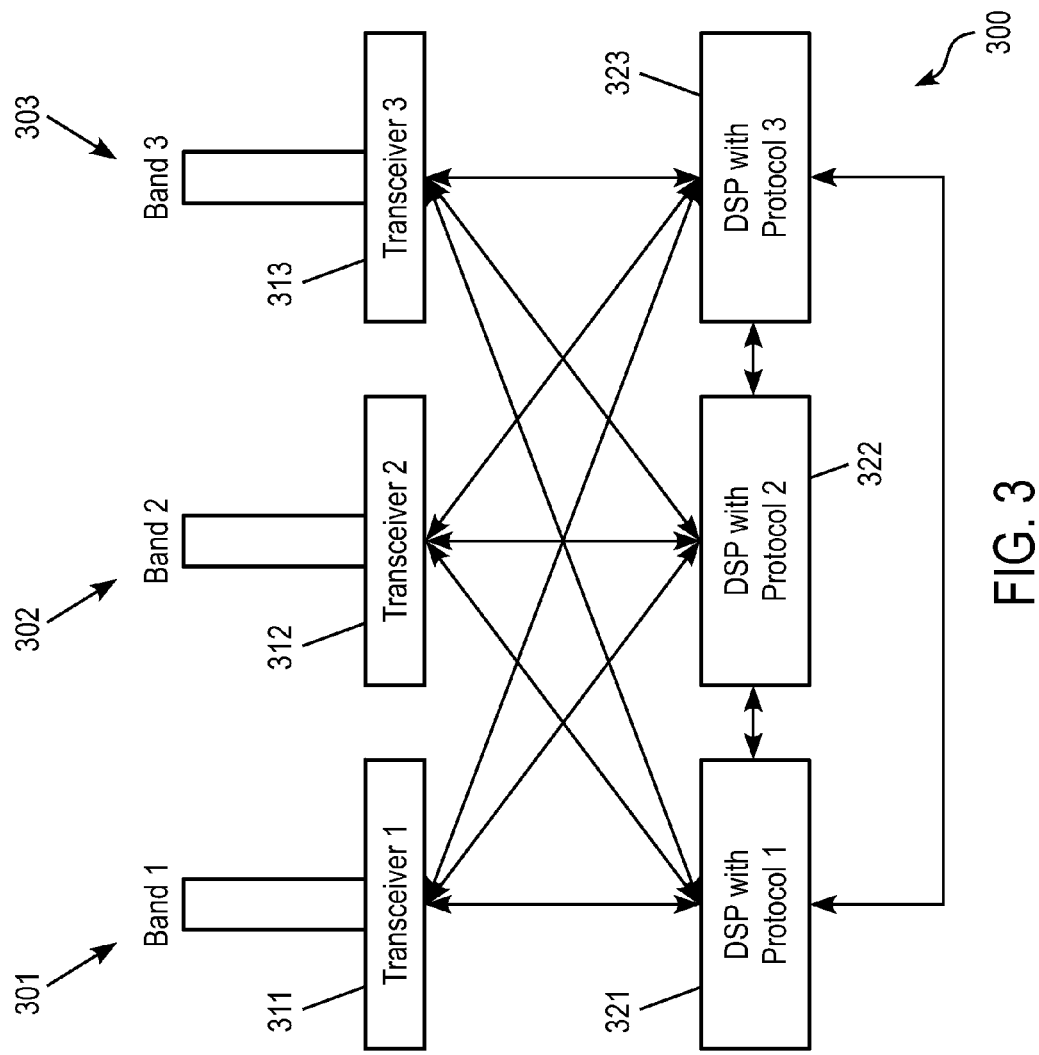
FIG. 3 is a generalized block diagram illustrating a node as may be found in a communications network, according to an exemplary embodiment of the invention.

FIG. 3 is a generalized block diagram illustrating various components of a node as may be found in the communication network described above. The node 300 includes a plurality of communication modules 301, 302, 303. Each communication module 301, 302, 303 includes a processor 321, 322, 323, respectively, a memory (not shown), and a transceiver 311, 312, 313.

Although not illustrated in FIG. 3, each communication module 301, 302, 303 can also include an antenna coupled to each transceiver 311, 312, 313 for conducting wireless communications, as well as any elements necessary for the modules 301, 302, 303 to operate properly and perform its functions. The frequency range associated with each transceiver is generally different but some wireless communication protocols can co-exist on the same band (e.g., ultrawideband).

Although three communication modules 301, 302, 303 are shown and described in the illustrated embodiment, communication modules 301, 302, 303 are shown and described for illustration purposes only. Those of skill in the art should understand that any number of communication modules can be used. In some embodiments, the nodes can include three of more communication modules. In other embodiments, the nodes can include fewer than three communication modules.

Each processor 321, 322, 323 is configured to be coupled to a corresponding transceiver 311, 312, 313. Although each processor 321, 322, 323 is illustrated as a digital signal processor (DSP) in FIG. 3, any suitable type of processor can be used (e.g., any device configured to process information based on operational or programming instruction). For example, in some embodiments the processors can include programmed microprocessors. Other embodiments can include a special purpose computer.

Each DSP 321, 322, 323 is configured to process data to be transmitted to or process data that is received by its associated transceiver 311, 312, 313. Each DSP 321, 322, 323 is further configured to operate according to a communication protocol. As illustrated in FIG. 3, DSP 321 operates according to a first protocol (i.e., protocol 1), DSP 322 operates according to a second protocol (i.e., protocol 2) different from the first protocol, and DSP 323 operates according to a third protocol (i.e., protocol 3) different from the first and second protocols. Protocols 1 through 3 can be any suitable protocol/communication technique including, but not limited to ZigBee, 3G, SSN, PCS, and FHSS protocols.

Each DSP 321, 322, 323 is configured to monitor its own communication parameter data and to cooperate with the other DSPs by sharing communication parameter data. For example, DSP 321 is configured to monitor its own communication parameter data including, but not limited to, frequency, bandwidth, band availability, band reliability, modem state, band occupancy, radio requirements, etc. DSP 321 can be configured to send messages to the remaining DSPs 322, 323 within the node 300 to report its communication parameter data. Concurrently, DSP 321 is configured to receive messages from the remaining DSPs 322, 323 including their communication parameter data. Said another way, each DSP is configured to share its own communication parameter data and receive parameter data from the remaining DSPs in a continuous bi-directional manner in this exemplary embodiment. Alternatively, or as a mixture of the various functions, the sharing of parameter data and the interchange of messages can be coordinated by a coordination unit, an example of which is shown in the exemplary node of FIG. 5 as a separate coordination unit 510. Based on the shared communication parameter data, one communication module 301 can allow communication of another module 302-303 by utilizing one of its associated bands. Said another way, each communication module 301 is configured to allow communication of one module by utilizing a band associated with a companion module.

Although the communication parameter data is described as being shared by each module 301, 302, 303 in a continuous bi-directional manner, in some embodiments, each communication module 301, 302, 303 can be configured to cooperate with its companion modules by periodically sharing communication parameter data. The communication, whether continuous or periodic, can be unidirectional too.

As mentioned, each module includes a transceiver 311, 312, 313 configured to be coupled to DSPs 321, 322, 323, respectively. Each transceiver 311, 312, 313 is configured to enable the communication modules to transmit and receive data utilizing the protocol/communication technique of the DSP with which it is associated. For example, transceiver 1 (311) is configured to communicate to and receive data from each of DSP 321, DSP 322 and DSP 323 and is further configured to transmit data from one of DSPs 321, 322, 323 through Band 1 utilizing the protocol of DSP 321. Said another way, each module 301, 302, 303 implements a given communication protocol in various bands (e.g., Band 1, Band 2, and Band 3) and is configured to cooperate with each other to transmit data. In this way, an alternative band not normally associated with a given protocol can be used for the up-link, the down-link or both links of a communication stream. By "using" it is understood that the frequency of the transceiver 311 of one module 301 can be driven at a frequency of Band 2 or Band 3 associated with the protocol of another module 302, 303, but with its own protocol. Alternatively or additionally, the transceiver 312, 313 of another module 322, 323 can be driven by the DSP 321 of the first module 301 using the protocol of the first module 301, but using the band (Band 2, Band 3) of the other module 302, 303, which might be more advantageous if the different modules have differences in design for the particular band (antenna structure, power source, etc.)

In some cases, however, a module associated with the band where a message is received may not have capability to demodulate the message, as it may operate according to a different communication protocol, it can simply pass the signal samples (e.g. acquisition "I" voltage and generation "Q" voltage) to the intended module for actual demodulation.

This framework allows optimal spectrum access and usage. More specifically, the framework enables transmission with opportunistic bandwidth access, band scavenging, and sharing of white spaces by allowing each module a combined view of the communication spectrum.

Transceivers 311, 312, 313 can be any suitable transceiver. For example, in some embodiments, the transceivers can be wireless modems, but other wireless communication devices can be used.

Although the transceivers 311, 312, 313 and the DSPs 321, 322, 323, respectively, are illustrated as separate components, other configurations are possible. For example, in some embodiments, a DSP and its associated transceiver can be one unit. Said another way, most, if not all, of the transceiver's function can be implemented in the DSP. For example, specifically, any one or more of DSP 321, 322, 323 could be implemented with the functions of transceiver 311.

The memory (not shown) associated with each communication module 301, 302, 303 is configured to store the communication parameter values corresponding to the communication module with which it is associated. Any suitable memory type can be used and may be implemented using any suitable data storing technology. For example, in some embodiments a semiconductor-based memory device can be used but magnetic, optical and hybrids of all three types, or any other suitable type of memory can be used.

Figure 4:
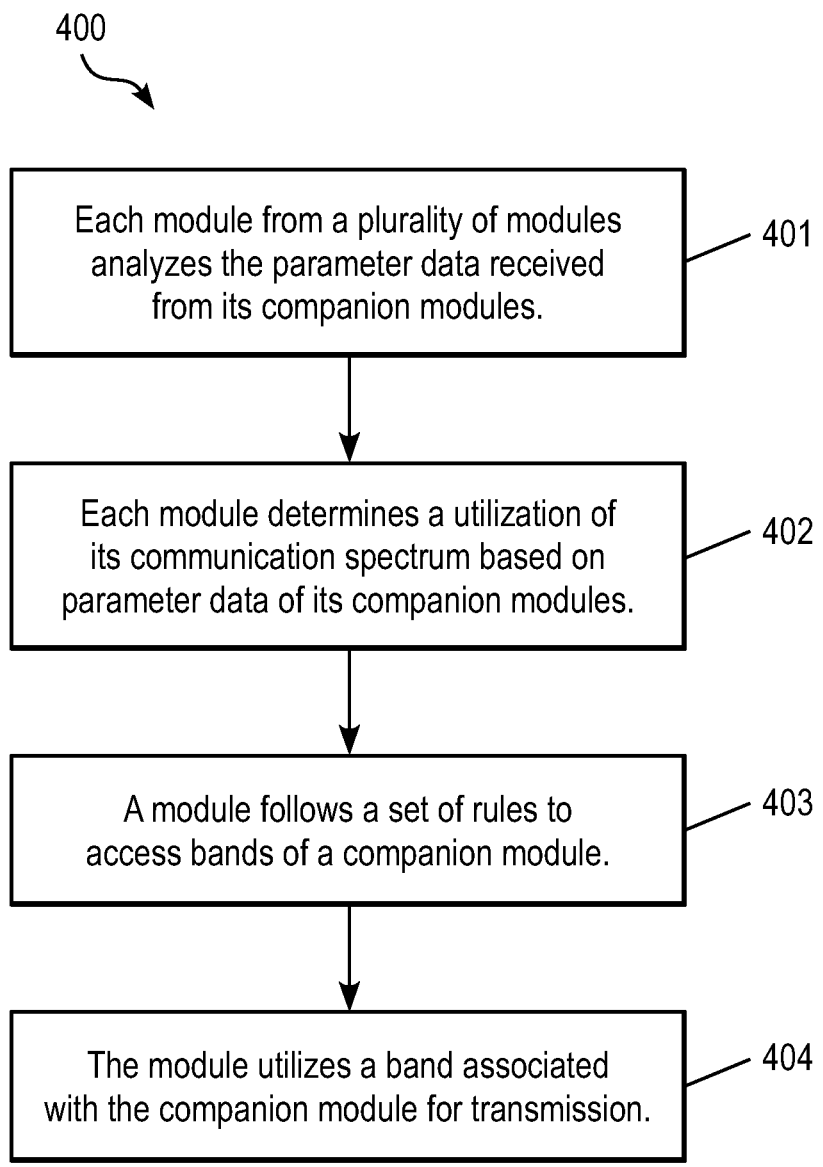
FIG. 4 is a generalized flow diagram illustrating a process for utilizing an available band of a companion module, according to an exemplary embodiment of the invention.

FIG. 4 is a generalized flow diagram of a process 400 for utilizing an available band of a companion module. At step 401, each communication module 301, 302, 303 analyzes parameter data information received from its companion modules. By analyzing its companion modules' parameter data, a communication module 301, 302, 303 can determine if there are underutilized bands associated with its companion modules for particular geographical regions at a particular time. At step 402, each communication module 301, 302, 303 determines a utilization of its communication spectrum based on the analyzed parameter data of its companion modules. This allows each module 301, 302, 303 a combined view of the communication spectrum. Not only can analyzing companion modules' parameter data help modules determine the under-utilization of bands for each direction of communication, or both directions, and with respect to which node it is communicating with, but can also be used to optimize the timing of transmissions. For instance, short communications in one direction can be on one band, while communications in another direction might be longer, and therefore use a band that is less utilized at that time. This can accomplish minimizing cross-interference, particularly when there is an overlap between the bands used by the plurality of communication modules.

At step 403, a module from the plurality of modules 301, 302, 303 follows a set of rules prior to accessing bands of a companion module. Firstly, if the primary band associated with a module is unavailable, unreliable, and/or overloaded, the module can access a band associated with a companion module. Secondly, if the transceiver/modem of which the primary band is associated with is in a specific state including out-of-service (OOS) or in an idle state and the band is unoccupied on a weekend day late at night, the module can access a band associated with a companion module. For example, in reference to FIG. 3, if Band 1 of module 301 is either unavailable, unreliable, or overloaded, in at least one communication direction, module 301 is then permitted access either Band 2 associated with companion module 302 or Band 3 associated with companion module 303 depending on the parameter data received by module 1 from each of companion modules 302, 303.

As another example, still in reference to FIG. 3, if transceiver/modem 312 of module 302 is out-of-service, module 302 is then permitted access either Band 1 associated with companion module 301 or Band 3 associated with companion module 303 depending on the parameter data received by module 2 from each of companion modules 301, 303.

As stated above, if a communication module 301 is unable to transmit in its associated bands based on the aforementioned rules, then the module 301 can communicate by cooperating and utilizing a band associated with a companion module 302, 303. At step 404, the module 301 utilizes a band associated with the companion module for transmission. The band associated with the companion module can be, for example, underutilized or unoccupied. The module 301 can cooperate with its companion modules 302, 303 in a number of ways. For example, in some embodiments, the module can freely utilize the bands associated with the companion module if no transmissions are occurring or planned at that time, and the band is estimated as empty. In other embodiments, the module can piggyback on a transmission occurring in the band associated with the companion module if a transmission is occurring or planned at that time. In yet other embodiments, the module can queue its message for future transmissions in the band of the companion module if consistent failures occur in other bands.

In some embodiments, more sophisticated spectral analysis techniques may be used to further analyze the bands and determine if a transmission is actually occurring at the time of a desired transmission. For example, the bandwidth used must agree with the properties of the band usage per that particular communication protocol. Time based analysis can be used as well, for example, to determine if a signal has expected autocorrelation properties.

An example where the above described process may be utilized is a node including a plurality of modem components including a 3G (WCDMA) communication modem that operates in a licensed spectrum, a proprietary frequency-hopping based communication modem that operates in various unlicensed bands, and an 802.15.4 modem that implements the ZigBee protocol and operates in unlicensed 2.4 GHz spectrum. The above described process enables access to the licensed spectrum by protocols currently using license-free spectrum (if regulation rules allow). It also enables optimal sharing of the 2.4 GHz band between the proprietary FHSS-based module and ZigBee module.

Utility networks configured to support a plurality of communication protocols and reception/transmission in a plurality of bands may use a variety of devices capable of communicating. Example preferred embodiments of systems components are shown and described in connection with FIGS. 5, 6, and 7.

Figure 5:
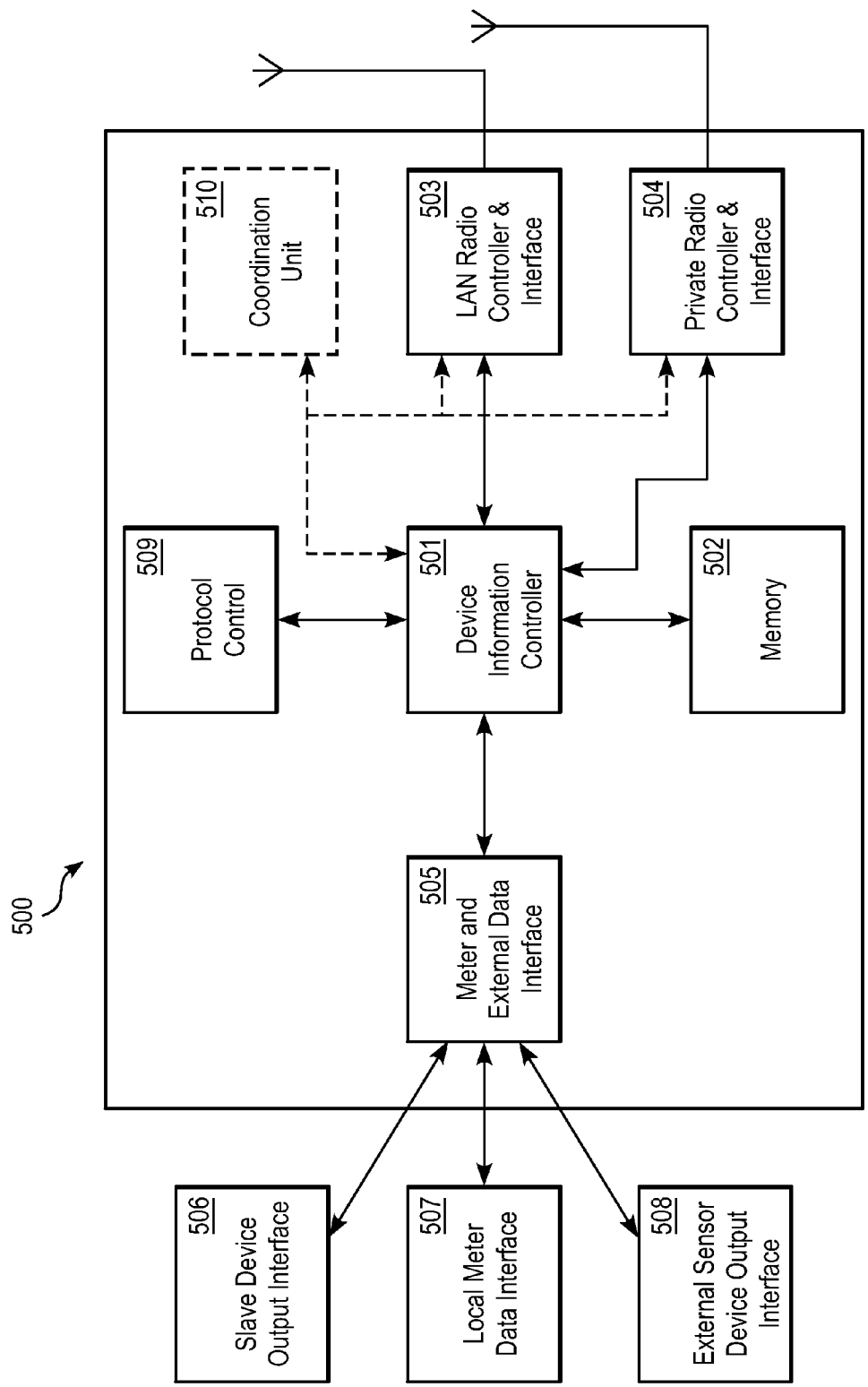
FIG. 5 is a generalized block diagram illustrating a node as may be found in a communications network, according to an exemplary embodiment of the invention.

FIG. 5 is a generalized block diagram of another exemplary node 500 as may be found in a communications network described above. In one preferred embodiment, node 500 may include a device information controller 501, memory 502, LAN radio controller and interface 503, private radio controller and interface 504, meter and external data interface 505, and a protocol controller 509. Here, the device information controller 501 can act as a coordination unit, or there can be a separate coordination unit 510, with both being examples of an intelligent coordinator approach. Alternatively, the coordination can be the radio controllers 503 and 504, i.e., it has each modem operate independently, but share and act on data regarding parameters with other modems in the node, as one example of a distributed approach. Meter and external data interface 505 may connect to a slave device 506, local meter data interface 507, and or an external sensor device output interface 508.

The wireless communication coordination unit 510 includes an interface that receives information on parameter data from at least two communication modules, a memory device for storing parameter data received through the interface from the communication modules and a processor for analyzing the parameter data received through the interface of the communication modules. The analysis is carried out using a set of band access rules. For instance, the coordination unit can use band access rules, information on band availability and modem usage to derive a schedule for band access for each communication module. The band access rules includes utilizing wherein the set of rules includes utilizing an underutilized band associated with the companion module, piggy-backing on a transmission in the band associated with the companion module, and queuing a message at the companion module for future transmission in the band associated with the companion module if failures consistently occur.

While the example node 500 of FIG. 5 does not include a meter for metering a commodity, alternative embodiments may include metering capability.

The exemplary node 500 includes radio modems such as illustrated as a private network radio or LAN radio, alternative embodiments of the node may include one or more radios using protocols such as, but not limited to ZigBee, 3G, SSN, PCS, and FHSS protocols, as mentioned elsewhere herein.

Although node 500 is illustrated and described as a single device, alternative embodiments may use multiple computers, electronic devices or radios in implementing example node 500.

Figure 6:
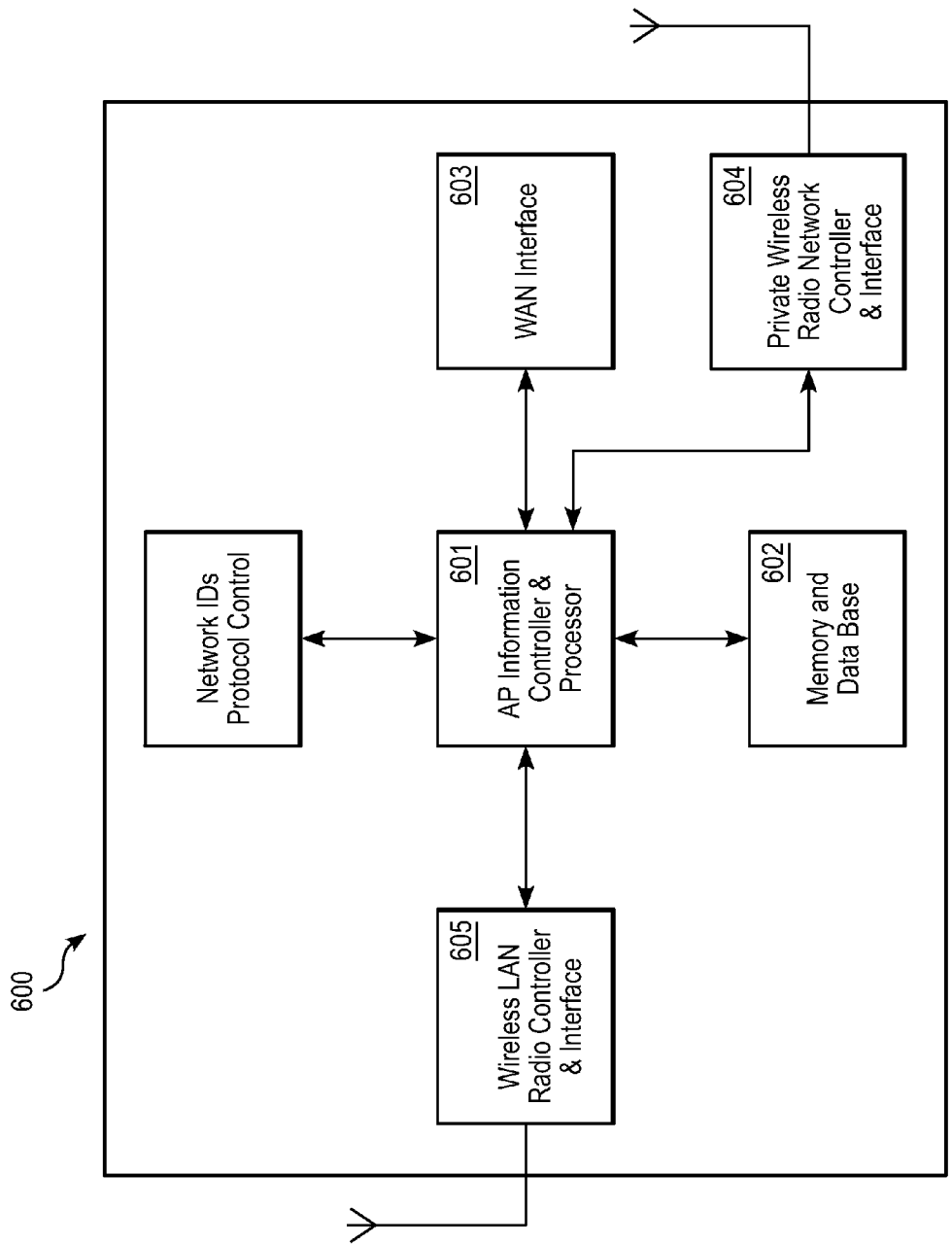
FIG. 6 is a generalized block diagram illustrating an access point as may be found in a communications network, according to an exemplary embodiment of the invention.

FIG. 6 is a generalized block diagram of an access point 600 as may be found in a communications network described above. Access point 600, which may also act as a gateway to nodes in a network such as a wireless LAN, may include an access point information controller 601, memory 602, a WAN interface 603, a private wireless radio network controller 604, a wireless LAN radio controller and interface 605, and network IDs IP protocol control 606. An access point, when it has more than one modem, can act and be considered a node with respect to the present invention. On a related note, although access point 600 is distinct from a meter or other device in the network (e.g., a relay, etc.), other embodiments could combine the functionality of a node, meter, relay, or any other device or system in the network.

Although access point 600 is described in this particular embodiment as a single device, alternate embodiments may use multiple computers, electronic devices or radios in implementing access point 600.

Figure 7:
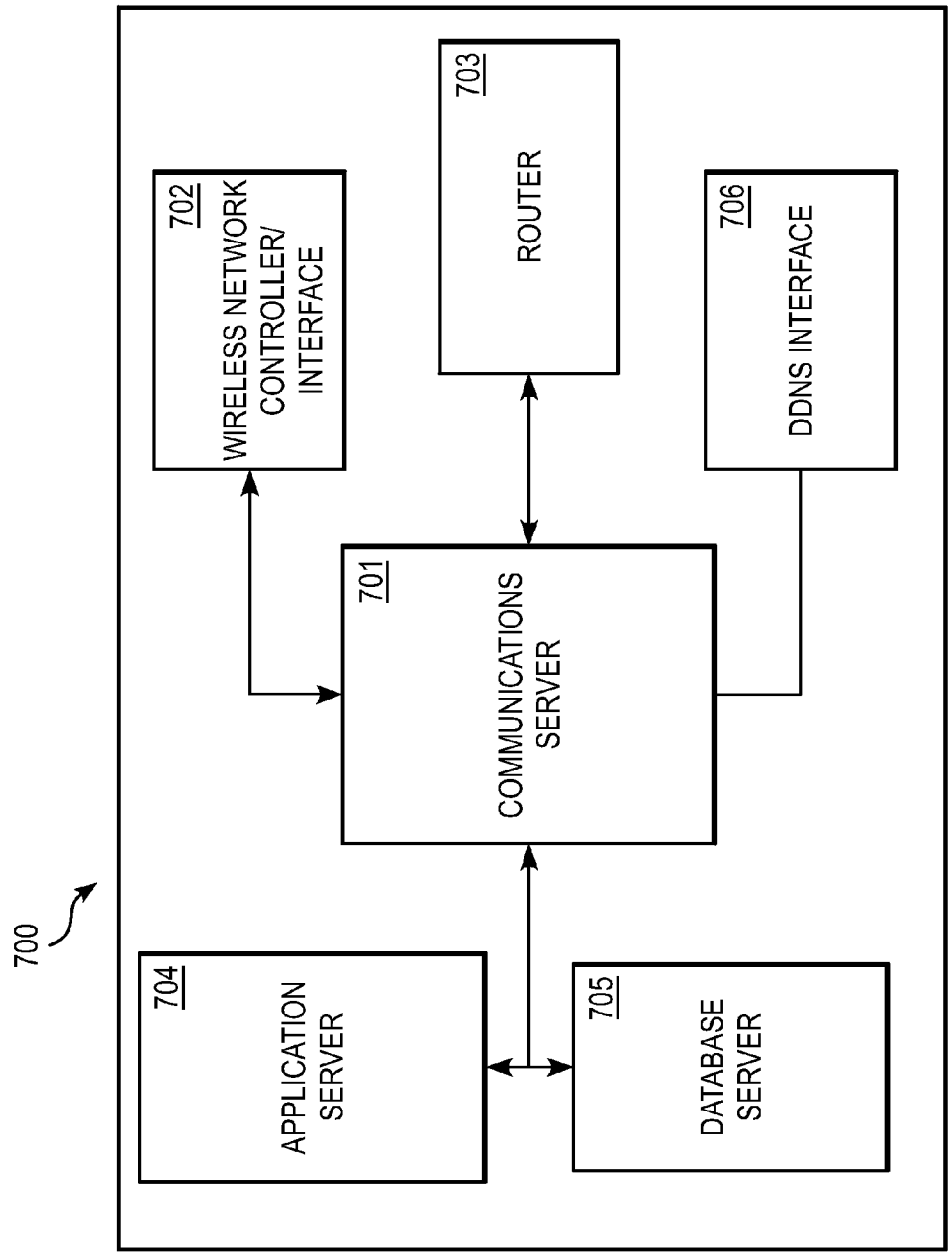
FIG. 7 is a generalized block diagram illustrating a back office system as may be found in a communications network, according to an exemplary embodiment of the invention.

FIG. 7 is a generalized block diagram of a back office system 700 as may be found in the communications network described above. The back office system 700 may include a communications server 701, a wireless private network communications controller 702, a router 703, an application server 704, and a database server 705. The wireless private network communications controller 702 may communicate with a private wireless network. The router 703 may communicate with the WAN. The WAN may be the internet, an intranet, or any other type of wide area network. The application server 704 may be any type of application which may be used in a utility network. Examples, without limitation, include billing applications, accounting applications, outage detection and/or management applications, configuration and/or provisioning applications, network applications such as a proxy server, a DNS or DNS server, a storage, back-up and/or recovery application, a customer interface application (for example, an interface application to allow a customer to control aspects associated with a node or to control aspects of a node), a node manager, a content management or delivery system, a communication manager or communication providing application, etc.

While the back office system 700 is described as a single entity, it may be implemented on one or more computers, for example on multiple servers in a data center. The described components of the back office system 700 may be implemented on different computers, or may be implemented across multiple computers. Additionally, the back office system 700 may be implemented across multiple computers in multiple locations or on multiple networks. The back office system 700 may also aggregate or include multiple applications. For example, the back office system 700 may include both an accounting system as well as a customer billing system. As another example, the back office system 700 may include a billing system and a proxy server. Additional combinations of any number of applications may be included in additional alternate embodiments.

Figure 8:
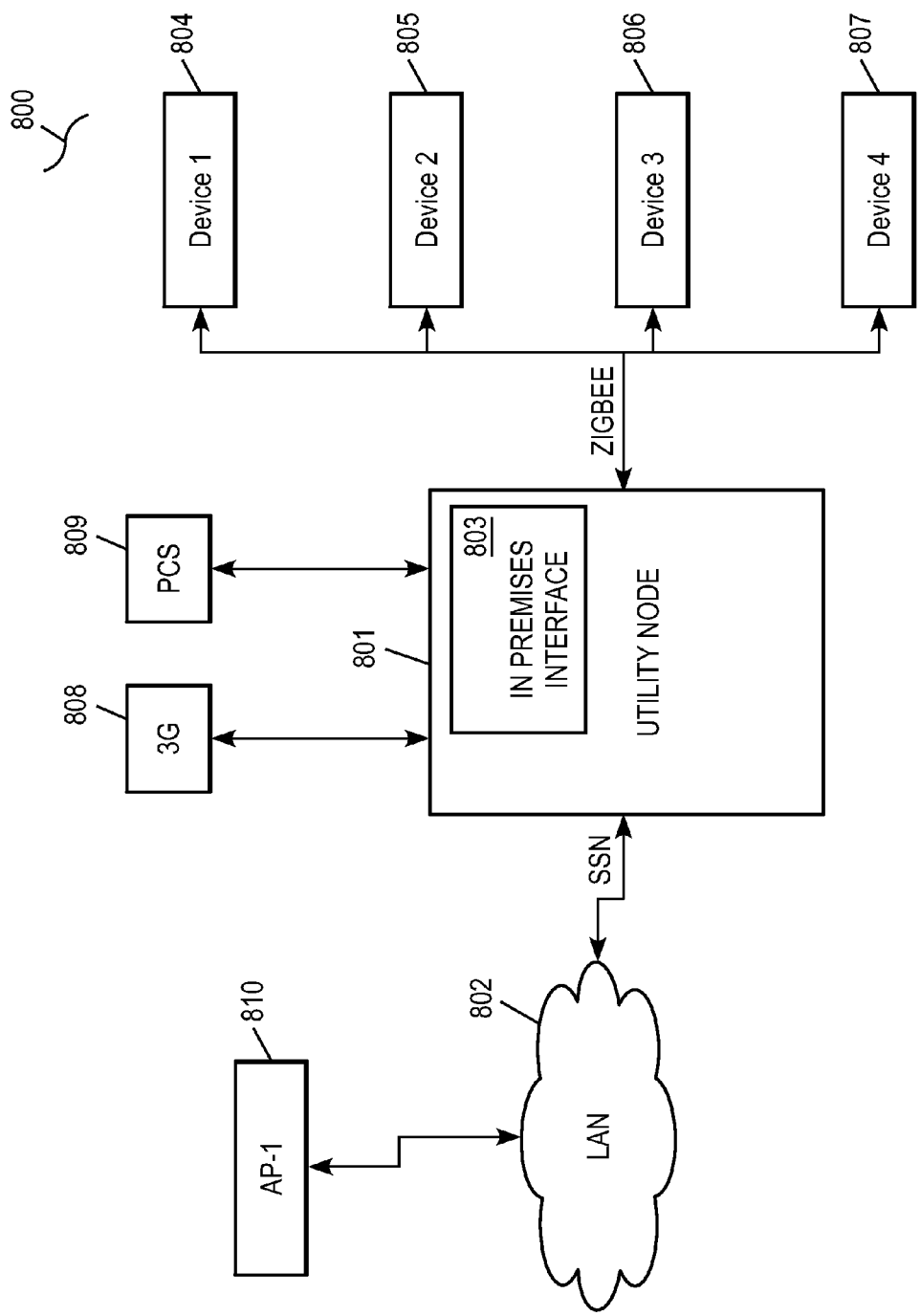
FIG. 8 is a generalized block diagram illustrating a sub-network of a utility node, according to an exemplary embodiment of the invention.

FIG. 8 is a generalized block diagram illustrating a utility node sub-network 800, to show an alternative exemplary embodiment. Sub-network 800 may include a utility node 801. The utility node 801 may include a commodity meter, or may interface with a commodity meter. Utility node 801 is configured to communicate with a communications network (e.g, a LAN) 802 via SSN technology, for example, and is configured to communicate with a mobile communications device via 3G and/or PCS technology, for instance, each representing a different communications module 808, 809.

The utility node 801 includes an in-premise device interface 803. In-premise device interface 803 connects to in-premise devices 804-807 to provide a communications link between the utility node and the in-premise devices. Additionally, the utility node may provide a communications link between the in premise devices 804-807 and the communications network 802 connected to the utility node 801.

In the illustrated embodiment, the utility node 801 is deployed in a residential unit (a house) and is capable of communicating with in-premise devices 804-807 (devices within the home) through multiple protocols and communications technologies. For example, the utility node 801 may communicate with devices using ether a wireless personal area network (WPAN) or using PLC (Power Line Carrier) communications with PLC capable devices connected to the home's power grid.

The sub-network 800 includes four in-premise devices (804-807) in this example, but is not so limited. The devices 804, 805, 806 and 807, for example, communicate via WPAN, device 808 communicates via 3G, and device 809 communicates via PLC. In the illustrated embodiment, the WPAN implements the ZigBee (IEEE 802.15.4) network technology. However, in other embodiments, the WPAN may be any one, or any combination, of network technologies or standards including, without limitation, Bluetooth, ZigBee (IEEE 802.15.4), IrDA, UWB (IEEE 802.15.3), Dust TSMP, Insteon, other technologies based upon IEEE 802.15, etc. or other communication protocols.

The utility sub-network 800 includes other utility nodes and at least one access point 810, as well as a Business Operating System (BOS) (not illustrated in FIG. 8) for managing node 801.

The utility node 801 may include for example an electricity usage meter which monitors and reports the electrical usage of the home. Additionally, node 801 includes an interface for other commodity meters, which is connected to for example a natural gas meter which monitors and reports the natural gas usage of the home.

While various embodiments of the invention have been described above, it should be understood that they have been presented by way of example only, and not limitation. Where methods described above indicate certain events occurring in certain order, the ordering of certain events may be modified. Thus, the breadth and scope of the invention should not be limited by any of the above-described embodiments but should be defined only in accordance with the following claims and their equivalents.

The previous description of the embodiments is provided to enable any person skilled in the art to make or use the invention. While the invention has been particularly shown and described with reference to embodiments thereof, it will be understood by those skilled in the art that many variations, modifications and alternative configurations may be made therein without departing from the spirit and scope of the invention.

For example, although described as one component, in some embodiments, the processor and digital signal processor can be two separate components. Said another way, each module can include a digital signal processor (DSP) directly or indirectly coupled to the processor for processing data to be transmitted or data that are received via each transceiver.

As another example, although described and illustrated as continuously or periodically sharing communication parameter data, in some embodiments, each module can be configured to scan all possible bands where transmissions might occur in order to reliably detect communications in those bands.

As yet another example, although the modules are described as being configured to scavenge for underutilized or unused bands, in some embodiments, a first module can send messages to a second module on a designated band and the second module to return a message to the first module on a second designated band. As a further example, in some embodiments, one band can be dedicated to short messages only and another for longer messages. In such cases, if the message from the first module to the second module is a short message, the first module would utilize a band dedicated to the short messages only as mentioned above.

Thus, other configurations for a wireless communication network system can be used to perform the communication between modules as described herein, while still remaining within the scope of the invention.

What is claimed is:

1. A wireless communication system comprising:
a plurality of nodes;
wherein at least one node of the plurality of nodes includes a plurality of communication modules, each communication module including a modem and being configured to operate according to a communication protocol associated with a frequency band, respectively;
wherein each communication module is configured to monitor its own communication parameter data and to cooperate with other communication modules of the node according to a set of rules by sharing communication parameter data, each communication module being further configured to allow communication using a first communication protocol of a first one of the communication modules associated with a first frequency band by utilizing a second frequency band associated with a second one of the communication modules so as to utilize an alternate frequency band unassociated with the first communication protocol of the first one of the communication modules and associated with a second communication protocol of the second one of the communication modules; and
a coordination unit that coordinates communications between communication modules of the node, said coordination unit operating according to band access rules based on band availability and modem usage to derive a schedule for band access for each communication module,
wherein the first one of the communication modules from the plurality of communication modules is configured to operate according to the first communication protocol, and the second one of the communication modules from the plurality of communication modules is configured to operate according to the second communication protocol different from the first communication protocol.

2. The system of claim 1, wherein said at least one node uses band access rules, information on band availability from the communication modules and information on modem usage to derive a schedule for band access by each modem.

3. The system of claim 1, wherein the communication parameter data includes at least one of band availability, band reliability, modem state, band occupancy, and radio requirements.

4. The system of claim 1, wherein the set of rules includes utilizing an underutilized band associated with the second one of the communication modules, piggy-backing on a transmission in the underutilized band associated with the second one of the communication modules, and queuing a message at the second one of the communication modules for future transmission in the underutilized band associated with the second one of the communication modules if failures consistently occur.

5. The system of claim 1, wherein the first communication protocol includes one of a ZigBee protocol, 3G protocol, SSN protocol, PCS protocol, and FHSS protocol, and
wherein the second communication protocol includes one of the ZigBee protocol, 3G protocol, SSN protocol, PCS protocol, and FHSS protocol.

6. The system of claim 1, further comprising:
at least one wide area network configured to receive communication from at least one access point.

7. The system of claim 1, further comprising:
at least one access point configured to provide communication to at least one wide area network.

8. The system of claim 1, wherein the first one communication modules is configured to shift its associated frequency to utilize the band associated with the second one of the communication modules.

9. The system of claim 1, wherein the first one of the communication modules is configured to use a transceiver and band of the second one of the communication modules.

10. A node of a wireless system comprising:
a plurality of communication modules, each communication module including a modem configured to operate according to a communication protocol;
wherein each communication module is configured to monitor its communication parameters, share its communication parameter information with other communication modules of the node and receive communication parameter information from the other communication modules of the node such that each communication module, according to a set of rules, can cooperate with the other communication modules based on the shared communication parameter information between the communication modules to allow communication using a communication protocol of one communication module by utilizing a band which is (i) unassociated with the communication protocol of the one communication module, (ii) associated with the other communication module and (iii) associated with another communication protocol of the other communication module; and
a coordination unit that coordinates communications between companion modules, said coordination unit operating according to band access rules information based on band availability and modem usage to derive a schedule for band access for each communication module,
wherein the one communication module from the plurality of communication modules is configured to operate according to a first communication protocol, and the other communication module is configured to operate according to the other communication protocol different from the first communication protocol.

11. The node of claim 10, wherein the set of rules includes utilizing an underutilized band associated with the other communication module, piggy-backing on a transmission in the underutilized band associated with the other communication module, and queuing a message at the other communication module for future transmission in the band associated with the other communication module if failures consistently occur.

12. The node of claim 10, wherein said at least one node uses band access rules, information on band availability from the other communication module and information on modem usage to derive a schedule for band access by each modem.

13. The node of claim 10, wherein the communication protocol includes one of a ZigBee protocol, 3G protocol, SSN protocol, PCS protocol, and FHSS protocol.

14. The node of claim 10, wherein the one communication module is configured to share its communication parameters with the other communication module via either continuous sharing or periodical sharing.

15. The node of claim 10, wherein the one communication module is configured to shift its associated frequency to utilize the band associated with the other module.

16. The node of claim 10, wherein the one communication module is configured to use a transceiver and band of the other communication module.

17. A method of communication in a communications node comprising:
monitoring communication parameter data at each communication module from a plurality of communication modules of a node, wherein each communication module includes a modem configured to operate according to a communication protocol associated with a frequency band, respectively;
sharing the communication parameter data of one communication module of the node with another communication module of the node;
allowing communication using a first communication protocol of a first one of the communication modules in a frequency band associated with a second one of the communication modules according to a set of rules so as to utilize an alternate frequency band unassociated with the first communication protocol of the first one of the communication modules and associated with a second communication protocol of the second one of the communication modules; and
coordinating communications between communication modules of the node by a coordination unit operating according to band access rules based on band availability and modem usage to derive a schedule for band access for each communication module,
wherein the first one of the communication modules from the plurality of communication modules is configured to operate according to the first communication protocol, and the second one of the communication modules from the plurality of communication modules is configured to operate according to the second communication protocol different from the first communication protocol.

18. The method of claim 17, wherein said allowing communication includes shifting frequency of the first one of the communication modules to utilize the frequency band associated with the second one of the communication modules.

19. The method of claim 17, wherein said allowing communication includes using a transceiver and frequency band of the second one of the communication modules.

20. The method of claim 17, wherein the first one of the communication modules uses band access rules information on band availability from the second one of the communication modules and information on modem usage to derive a schedule for band access by each of the communication modules.

21. The method of claim 17, wherein said allowing communication includes piggybacking a first transmission from the first one of the communication modules on a second transmission from the second one of the communication modules.

22. The method of claim 17, wherein said allowing communication using a protocol of the first one of the communication modules in a band associated with the second one of the communication modules includes communication in one band in one direction and communications in another direction on another band.

23. A node of a wireless system comprising:
- a plurality of communication modules, each communication module including a modem configured to operate according to a communication protocol associated with a frequency band, respectively; and
- a coordination unit, comprising:
  - an interface for receiving information on parameter data from at least two communication modules;
  - a memory device for storing said parameter data received through said interface from said communication modules, and storing band access rules; and
  - a processor for analyzing parameter data received through said interface from said communication modules to coordinate communications between communication modules of the node so that, in accordance with the band access rules, a first one of the communication modules is configured to utilize a first communication protocol with a frequency band associated with a second one of the communication modules, the frequency band associated with the second one of the communication modules being unassociated with the first communication protocol and associated with a second communication protocol of the second one of the communication modules,
  - wherein the first one of the communication modules from the plurality of communication modules is configured to operate according to the first communication protocol, and the second one of the communication modules from the plurality of communication modules is configured to operate according to the second communication protocol different from the first communication protocol.

* * * * *